(12) United States Patent
Watanabe

(10) Patent No.: US 8,488,052 B2
(45) Date of Patent: Jul. 16, 2013

(54) IMAGING SYSTEM AND METHOD FOR DETECTING TARGET OBJECT

(75) Inventor: Go Watanabe, Narashino (JP)

(73) Assignee: Nikon Corporation, Tokyo (JP)

( * ) Notice: Subject to any disclaimer, the term of this patent is extended or adjusted under 35 U.S.C. 154(b) by 200 days.

(21) Appl. No.: 12/371,910

(22) Filed: Feb. 16, 2009

(65) Prior Publication Data

US 2009/0213263 A1 Aug. 27, 2009

(30) Foreign Application Priority Data

Feb. 25, 2008 (JP) ................................. 2008-042645

(51) Int. Cl.
*H04N 5/232* (2006.01)

(52) U.S. Cl.
USPC ......................................................... 348/349

(58) Field of Classification Search
USPC ............. 348/345, 347–349, 333.12, 353–355
See application file for complete search history.

(56) References Cited

U.S. PATENT DOCUMENTS

| 2001/0019620 | A1* | 9/2001 | Nagai et al. | 382/104 |
| 2004/0207743 | A1* | 10/2004 | Nozaki et al. | 348/333.12 |
| 2007/0216765 | A1* | 9/2007 | Wong et al. | 348/46 |

FOREIGN PATENT DOCUMENTS

JP 2004-185555 7/2004

* cited by examiner

*Primary Examiner* — Aung S Moe
(74) *Attorney, Agent, or Firm* — Ditthavong Mori & Steiner, P.C.

(57) ABSTRACT

An imaging system includes an imaging device, a recognition device, a focus detector, a correcting device, and a selecting device. The imaging device is configured to capture an image formed by an imaging optics. The recognition device is configured to recognize a target object candidate in the image captured by the imaging device. The focus detector is configured to detect a focus adjustment state of the imaging optics. The correcting device is configured to obtain a magnification of an image of the target object candidate and configured to correct the magnification based on the focus adjustment state with respect to the target object candidate detected by the focus detector. The selecting device is configured to select a target object from the target object candidate based on the corrected magnification corrected by the correcting device.

16 Claims, 8 Drawing Sheets

IMAGING SYSTEM AND METHOD FOR DETECTING TARGET OBJECT

CROSS-REFERENCE TO RELATED APPLICATIONS

The present application claims priority under 35 U.S.C. §119 to Japanese Patent Application No. 2008-042645, filed Feb. 25, 2008. The contents of this application are incorporated herein by reference in their entirety.

BACKGROUND OF THE INVENTION

1. Field of the Invention

The present invention relates to an imaging system and a method for detecting a target object.

2. Discussion of the Background

An imaging system has been known with which skin color areas are detected to extract face area candidates by image analysis, distance information of an imaging optical system is obtained to estimate a maximum size of a face that is to be actually taken into an image, and any skin color area that exceeds the maximum size is determined not to be a face area and excluded from the face area candidates (for example, see Japanese Unexamined Patent Publication No. 2004-185555). The contents of Japanese Unexamined Patent Publication No. 2004-185555 are incorporated herein by reference in their entirety.

However, with the above-described conventional system, a maximum size of a face is estimated based on a focal length when an imaging optical system is focused. Accordingly, distance information of the imaging optical system is unknown before the focusing, which results in a disadvantage that it is not possible to accurately estimate a size of a person's face. Moreover, a problem exists even after the focusing that, while it is possible to accurately estimate the size of a person's face on which the system is focused, it is not possible to accurately estimate the size of a person's face on which the system is not focused because there is an error in the distance information of the imaging optical system.

SUMMARY OF THE INVENTION

According to one aspect of the present invention, an imaging system includes an imaging device, a recognition device, a focus detector, a correcting device, and a selecting device. The imaging device is configured to capture an image formed by an imaging optics. The recognition device is configured to recognize a target object candidate in the image captured by the imaging device. The focus detector is configured to detect a focus adjustment state of the imaging optics. The correcting device is configured to obtain a magnification of an image of the target object candidate and configured to correct the magnification based on the focus adjustment state with respect to the target object candidate detected by the focus detector. The selecting device is configured to select a target object from the target object candidate based on the corrected magnification corrected by the correcting device.

According to another aspect of the present invention, a method for detecting a target object includes capturing an image formed by an imaging optics. A target object candidate is recognized in the captured image. A magnification of an image of the target object candidate is detected based on distance information of the imaging optics. A focus adjustment state of the imaging optics is detected. The magnification is corrected based on the focus adjustment state with respect to the target object candidate. A target object is selected from the target object candidate based on the corrected magnification. The target object is detected in the captured image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
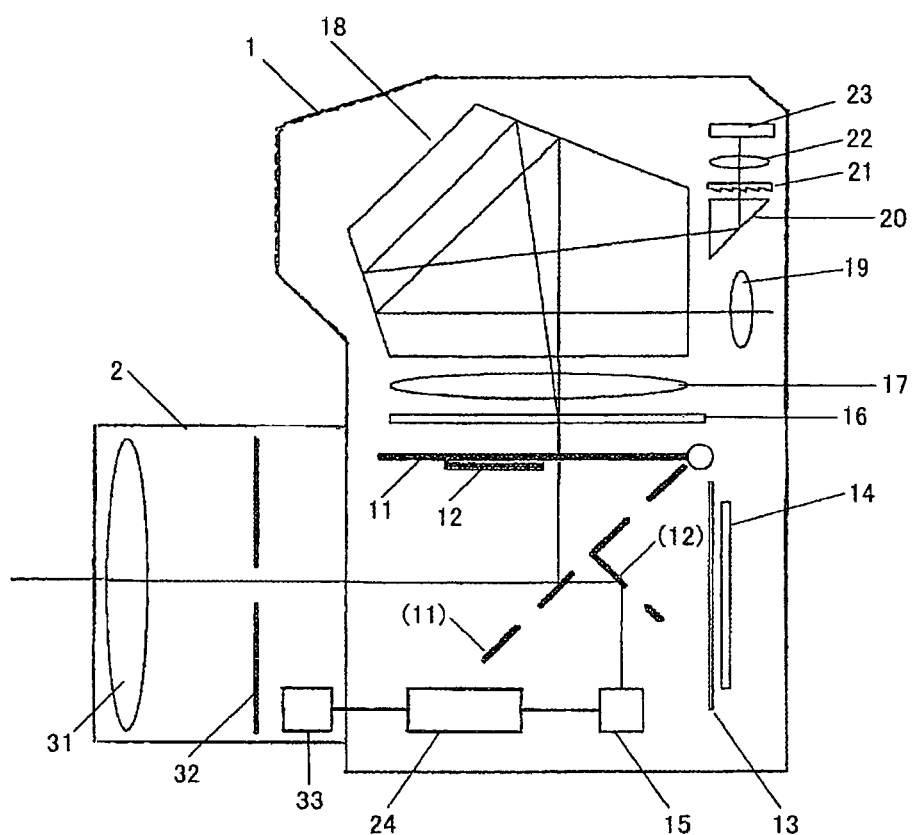
FIG. 1 is a horizontal cross-sectional view illustrating a structure of an imaging system according to one embodiment of the present invention.

Embodiments will now be described with reference to the accompanying drawings, wherein like reference numerals designate corresponding or identical elements throughout the various drawings.

The following describes an imaging system according to one embodiment of the present invention is applied to a single-lens reflex digital still camera capable of automatic focus adjustment (AF). FIG. 1 is a cross-sectional view illustrating a structure of the imaging system according to the one embodiment. In FIG. 1, devices and systems that are not related to the imaging system according to the embodiment of the present invention are not shown, and descriptions for such devices and systems are not given. A camera according to the one embodiment is configured such that a lens barrel 2 is removably provided for a camera body 1, and the lens barrel 2 can be replaced with a different lens barrel having an interchangeable lens of a different type.

The camera body 1 is provided with a main mirror 11, a sub mirror 12, a shutter 13, an imaging device 14, a focus detection device 15, a diffusion screen 16, a condenser lens 17, a roof pentaprism 18, an eyepiece 19, a photometric optical device 20, a diffractive optical device 21, a photometrical lens 22, a photometrical sensor 23, a body drive control device 24, and the like. The imaging device 14 is configured as a CCD, a CMOS, or such, and converts a subject image formed by an imaging lens 31 into an electric signal for output. The focus detection device 15 detects a focus adjustment state, that is a defocus amount, of the imaging lens 31. The body drive control device 24 is configured by a microcomputer (not shown), a ROM, a RAM, an analog-to-digital converter, and the like, and carries out operations such as various calculations for the camera, sequence control, and drive control for the imaging device.

On the other hand, the lens barrel 2 is provided with the imaging lens 31 (including a zoom lens and a focus lens), a diaphragm 32, a lens drive control device 33, and the like. The lens drive control device 33 is configured by a microcomputer (not shown), a ROM, a RAM, a lens driving actuator, a diaphragm driving actuator, and the like, and carries out operations such as a focus adjustment of the imaging lens 31 and an aperture adjustment of the diaphragm 32. The body drive control device 24 of the camera body 1 and the lens drive control device 33 of the lens barrel 2 are electrically connected via an electrical contact (not shown) provided for a mounting portion of the lens barrel 2, and receive and transmit various information between each other.

When not taking images, as shown by a dashed line in FIG. 1, the main mirror 11 and the sub mirror 12 are disposed in a camera optical path, and a part of light from a subject that has passed through the imaging lens 31 is reflected on the main mirror 11, and directed toward the diffusion screen 16, thereby forming a subject image. The subject image is directed to an eye of a photographer via the condenser lens 17, the roof pentaprism 18, and the eyepiece 19, and thus observed by the photographer. Further, the subject image on the diffusion screen 16 is directed to the photometrical sensor 23 via the condenser lens 17, the roof pentaprism 18, the photometric optical device 20, the diffractive optical device 21, and the photometrical lens 22, and is captured as a picture image by the photometrical sensor 23.

On the other hand, a part of the remaining part of the light from the subject passes through a central transmissive portion of the main mirror 11, and is reflected on the sub mirror 12 to be directed to the focus detection device 15, and the focus adjustment state, that is the defocus amount, of the imaging lens 31 is detected by the focus detection device 15. The focus detection device 15 is a focus detection device employing a pupil slicing and phase difference focus detection system, and detects defocus amounts respectively for a plurality of focus detection areas within a camera screen.

When taking images, as shown by a solid line in FIG. 1, the main mirror 11 and the sub mirror 12 are retracted from the camera optical path, and the subject image is captured by the imaging device 14. A signal for the subject image outputted from the imaging device 14 is processed by an image processing system (not shown), and the subject image is stored in a storage system such as a memory card (not shown).

Figure 2:
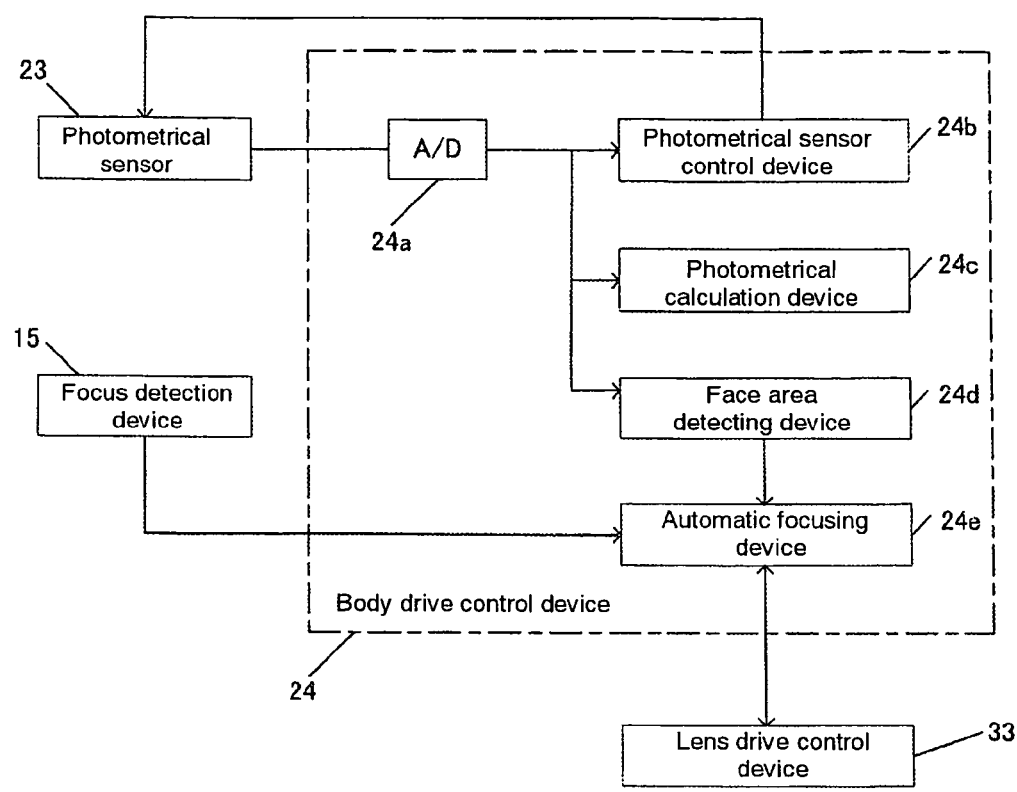
FIG. 2 is a block diagram illustrating a control according to the one embodiment of the present invention.

FIG. 2 is a control block diagram illustrating a photometrical operation, a face area detection operation, and an auto focusing (AF) operation according to the one embodiment. The body drive control device 24 is configured by, depending on a software configuration of a microcomputer (not shown), a photometrical sensor control device 24b, a photometrical calculation device 24c, a face area detecting device 24d, an automatic focusing device 24e, and the like, as well as an analog-to-digital converter 24a. When carrying out a photometrical measurement of a field, the photometrical sensor control device 24b sets charge accumulation time and an amplifier gain for the photometrical sensor 23 so that a maximum brightness of the field is a desired photometric value, and carries out feedback control of the photometrical sensor 23. The photometrical calculation device 24c carries out photometrical calculation based on the photometric value by the photometrical sensor 23, and calculates a shutter speed and a diaphragm value corresponding to the brightness of the field.

In the one embodiment, instead of a picture image that has been captured by the imaging device 14 (see FIG. 1), the picture image that has been captured by the photometrical sensor 23 is used for detecting an area of a person's face in the picture image. The signal of the subject image that has been captured by the photometrical sensor 23 is inputted into the face area detecting device 24d after being converted into a digital signal by the analog-to-digital converter 24a of the body drive control device 24. When detecting the face area of a person, the photometrical sensor control device 24b sets the charge accumulation time and the amplifier gain of the photometrical sensor 23 so that the face area of a person corresponds to average brightness of the field, and carries out feedback control of the photometrical sensor 23. With this configuration, the person's face can have sufficient brightness even against the light.

The face area detecting device 24d detects color information and brightness information of the picture image that has been captured by the photometrical sensor 23, and extracts a candidate for an area of the person's face in the picture image based on the information. Further, to the face area detecting device 24d, distance information (a focal length, a camera-to-subject distance (a subject distance), and a distance error (an error between the focal length and the camera-to-subject distance)) of the imaging lens 31 (see FIG. 1) are inputted from the lens drive control device 33 via the automatic focusing device 24e, and the defocus amount is inputted from the focus detection device 15. Moreover, the face area detecting device 24d calculates the magnification of the image based on the distance information, corrects the magnification based on the defocus amount, and determines whether or not the face area candidate is a true face area based on the corrected magnification. Then, the face area detecting device 24d outputs the defocus amount of the focus detection area corresponding to the area that is determined to be the true face area to the automatic focusing device 24e.

The automatic focusing device 24e controls the lens drive control device 33 based on the defocus amount of the focus detection area corresponding to the true face area, and carries out the focus adjustment by driving the focus lens of the imaging lens 1 using the lens drive control device 33.

Figures 3A, 3B:
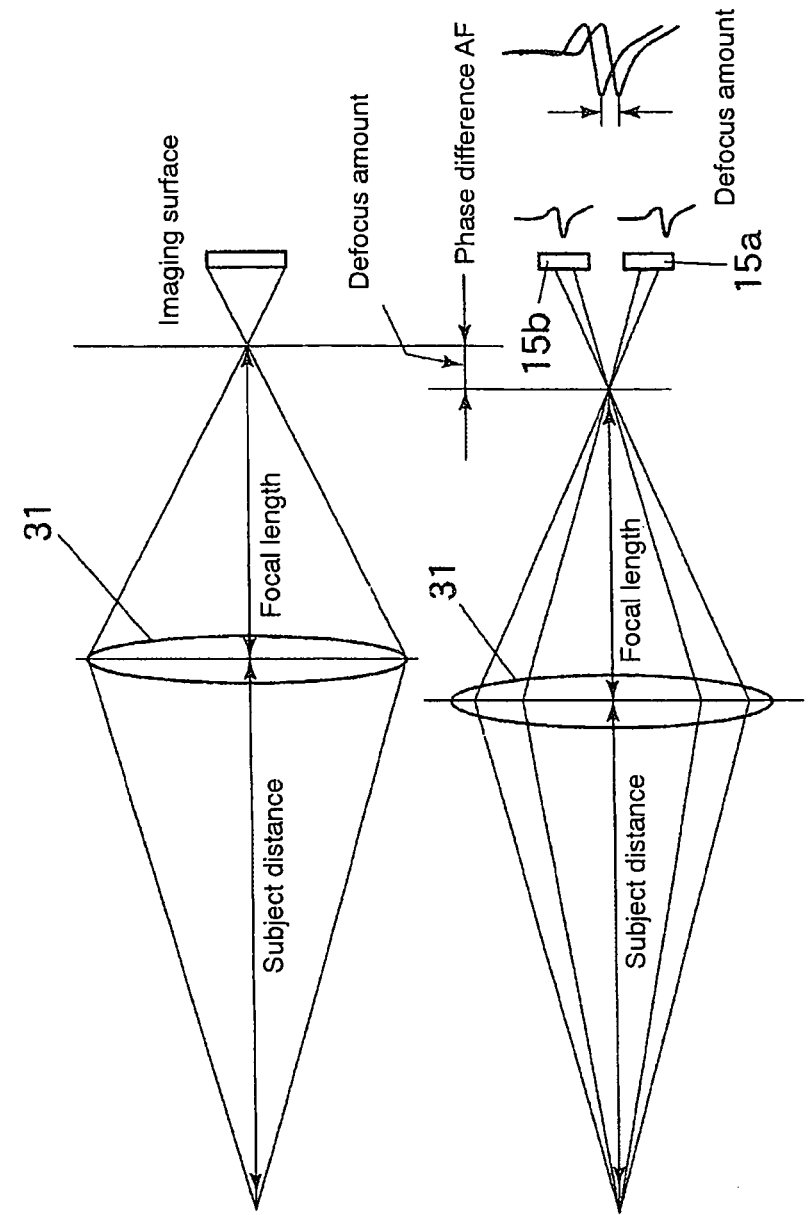
FIGS. 3A and 3B are diagrams each illustrating a principle of how a magnification is corrected based on a defocus amount.

Referring to FIGS. 3A and 3B, a principle of a magnification correction based on the defocus amount is described. FIG. 3A is a diagram schematically illustrating an imaging optical system of the imaging system according to the one embodiment, showing the subject distance (camera-to-subject distance) and the focal length when the imaging lens 31 (see FIG. 1) is focused on the subject. The lens drive control device 33 (see FIGS. 1 and 2) obtains the focal length by detecting a position of the zoom lens (not shown) of the imaging lens 31 using the sensor (not shown), and obtains the subject distance by detecting a status of a range ring (not shown) provided for the lens barrel 2 using an encoder. The body drive control device 24 obtains the distance information (the focal length and the subject distance (camera-to-subject distance)) from the lens drive control device 33, and calculates a magnification M based on an equation below.

$$M = (\text{focal length})/(\text{subject distance}) \qquad 1$$

In a strict sense, the subject distance (camera-to-subject distance) represents a distance from a surface of an object (subject surface) to a focal point in front of the imaging optical system, however it is simply described herein as the subject distance (camera-to-subject distance).

FIG. 3B is a diagram schematically illustrating a focus detection optical system of the imaging system according to the one embodiment, showing the subject distance and the focal length when the imaging lens is not focused on the subject. A pair of light fluxes for focus detection from the subject that have passed through the imaging lens 31 formed as images on a pair of line sensors 15a and 15b after passing through a separator lens (not shown) of the focus detection device 15, and then the defocus amount is calculated by detecting a phase difference between a pair of images using the line sensors 15a and 15b. In the one embodiment, using equations below, a displacement α of the magnification M by the defocus amount is calculated, and then a correct magnification M' when not focused is calculated by subtracting the displacement a from the magnification M.

$$\alpha = (\text{defocus amount})/(\text{focal length}) \qquad 2$$

$$M' = M - \alpha \qquad 3$$

Figure 4:
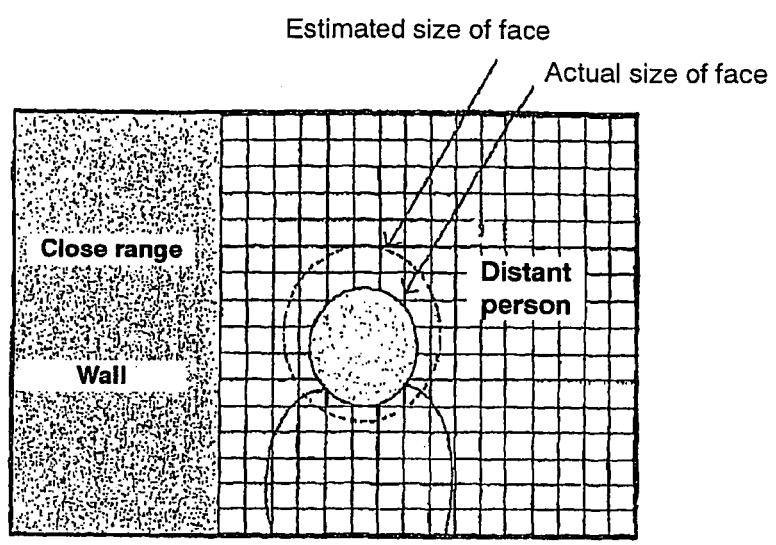
FIG. 4 is a diagram illustrating the imaging system focusing on a wall in front of a person (close range)

FIG. 4 shows a situation in which the focus is on a wall positioned in front of the person (close range). As the focus is not on the person in this situation, it is not possible to detect the subject distance to the person. In such a case, if the magnification M is obtained using the first equation only based on the focal length and the subject distance and a maximum size of the person's face is estimated, as in a case of the conventional imaging system, as the subject distance to the wall becomes shorter than the subject distance to the person, as can be clearly seen from the first equation, the magnification M for the person becomes larger than an actual magnification. Consequently, the estimated size of the face becomes larger than an actual size of the face. Therefore, according to the conventional imaging system, there can be a case in which the face area candidate extracted by detecting a skin color area based on an image analysis does not match the size of the face estimated based on the magnification M, and thus the face area candidate is falsely determined not to be the face area.

Figure 5:
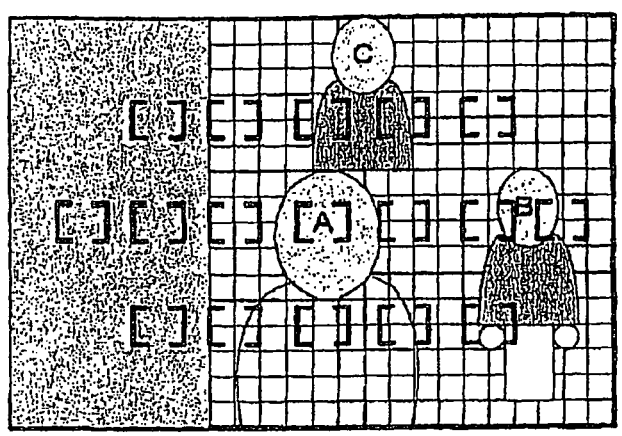
FIG. 5 is a diagram illustrating a working principle according to the one embodiment how the magnification is corrected based on the defocus amount while focusing on the wall in front of the person to accurately estimate a size of a person's face.

FIG. 5 is a diagram illustrating a working principle according to the one embodiment how the magnification is corrected based on the defocus amount while focusing on the wall in front of the person to accurately estimate the person's face. It should be noted that symbols [ ] in the figure represent a plurality of focus detection areas of the focus detection device 15 set within the camera screen. As described above, the skin color area is detected by the image analysis based on the color information and the brightness information of the picture image that has been captured, the candidate for the area of the person's face is extracted and the distance information of the imaging optical system is obtained to estimate the size of the face that is to be actually captured as an image, and the true face area is determined by checking the size with the face area candidate. Examples of parameters that represent the size of the face include a width and an area of the face, which can be represented by pixel device.

Specifically, while the focus is on the wall in front of the person, the magnification M for the wall is corrected based on the defocus amount of the focus detection area for a face of a person A in the figure, thereby calculating the magnification M' of the face of the person A. Then, based on the magnification M', the size of the face of the person A is estimated.

As in a case of a person B, when there are a plurality of focus detection areas for a face area, the focus detection area whose magnification M' after the correction based on the defocus amount is closest to an average value of the magnification M' of the plurality of focus detection areas is employed. When checking the face area candidates extracted by the image analysis with the face size based on the magnification M', the closer the magnification M' of the face area candidate to the average value, the more likely the face area candidate is determined to be the true face area.

Moreover, as in a case of a person C, when there is no focus detection area for the face area, it is not possible to correct the magnification M based on the defocus amount. In such a case, as in the conventional case, the size of the face based on the magnification M is checked with the face area candidate by the image analysis. Note that if the person C is positioned at substantially the same subject distance as the other person (in this case, A or B), the size of the face area candidate of the person C becomes substantially the same as the face area candidates of the other people (in this case, A and B), and the magnification M can be corrected using the defocus amount of the focus detection area for the other person's face whose face area candidate is as large as that of the person C, to obtain the magnification M' estimated for the face of the person C.

Figure 6:
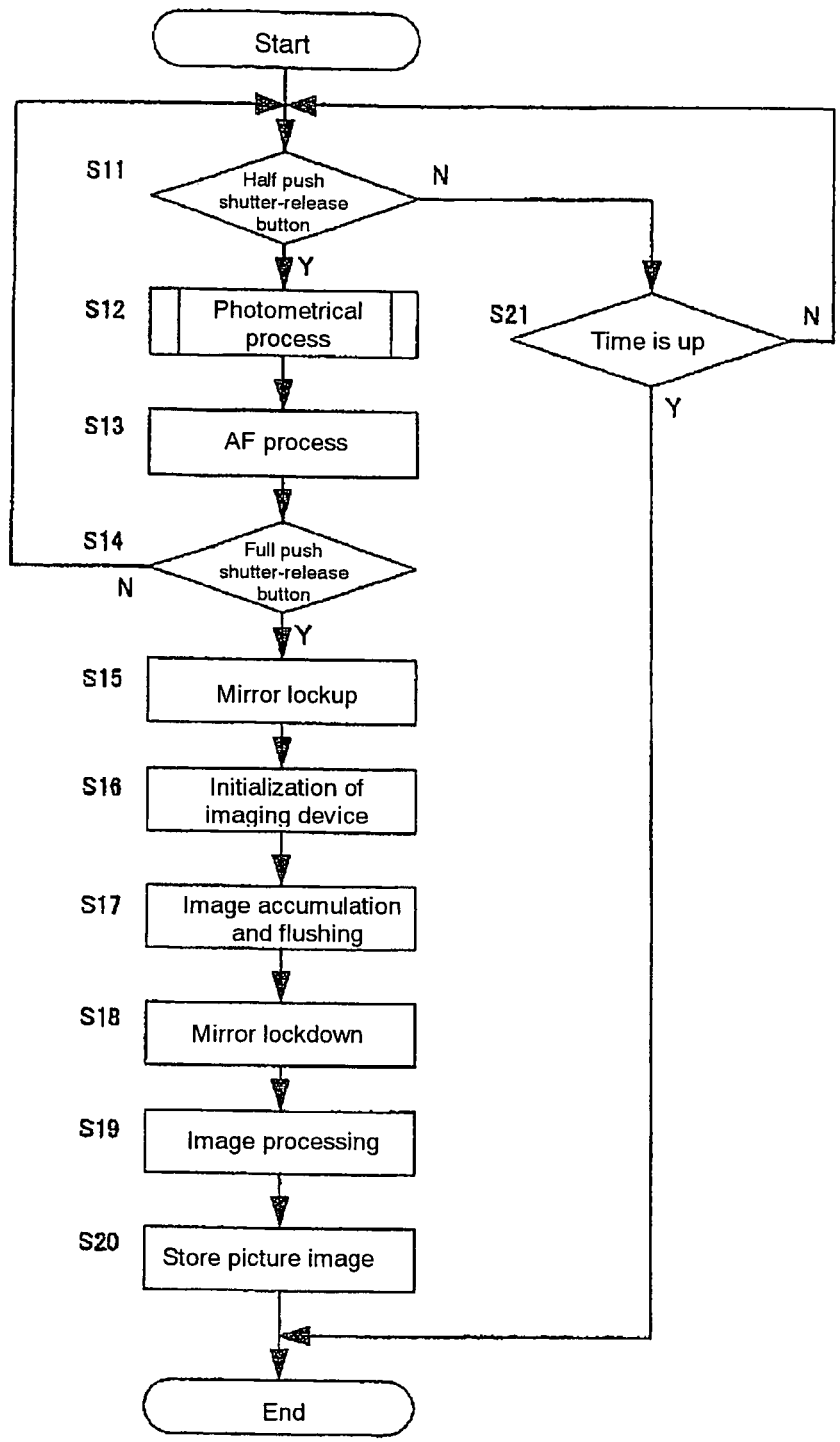
FIG. 6 is a flowchart illustrating an imaging operation according to the one embodiment.

FIG. 6 is a flowchart illustrating an imaging operation according to the one embodiment. The imaging operation according to the one embodiment is described with reference to this flowchart. The body drive control device 24 starts the imaging operation when a half-push switch of a shutter-release button (not shown) is turned on in step 11. If, in step 21, the halfway pressing operation of the shutter-release button is not carried out for a predetermined length of time after the imaging system is turned on, the imaging operation is terminated.

Figure 7:
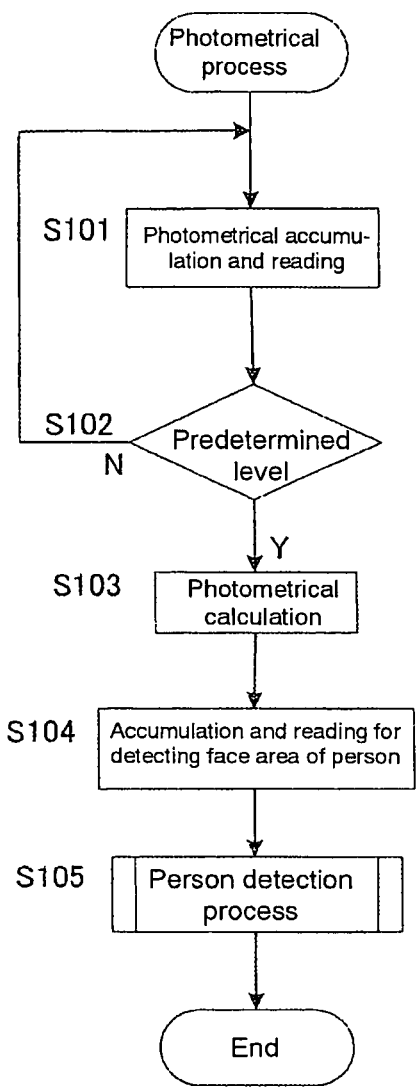
FIG. 7 is a flowchart illustrating a subroutine for a photometrical process.

In step 12, a subroutine for a photometrical process shown in FIG. 7 is carried out, and exposure control and a person detection process are carried out based on a result of the photometrical process. The photometrical process will be described in detail later. In step 13, an AF process is carried out, and focus adjustment for the focus lens (not shown) of the imaging lens 31 is carried out based on a result of the defocus amount detection by the focus detection device 15. In step 14, a full-push switch of the shutter-release button (not shown) is turned on, and when the full pressing operation is detected, the operation proceeds to step 15, and mirror lockup for the main mirror 11 and the sub mirror 12 is carried out. In step 16, the imaging device 14 is initialized, and in step 17 that follows, charge accumulation and accumulated data are flushed. In step 18 after the imaging, mirror lockdown is carried out, and then in step 19, the picture image that has been captured is processed, and further in step 20, the picture image that has been captured is stored in a storage medium (not shown).

FIG. 7 is a flowchart illustrating the subroutine for the photometrical process. In step 101, the photometrical sensor 23 carries out imaging for the photometrical process, that is, accumulation and reading of charge. In step 102, it is determined whether or not a maximum value of an output from the photometrical sensor 23 reaches a predetermined level. If the maximum value has not reached the predetermined level, the operation returns to step 101, and the charge accumulation time and the amplifier gain are set again to repeat the accumulation and reading of the charge. If the maximum value of the photometric value has reached the predetermined level, the operation proceeds to step 103, and the photometrical calculation is carried out. In the photometrical calculation, the brightness of the subject is calculated based on the output from the photometrical sensor 23, thereby calculating an appropriate value for the exposure.

As described above, in the one embodiment, in order to detect the face area of the person from the picture image that has been captured, the charge accumulation time and the output amplifier gain of the photometrical sensor 23 are set so that the face area of the person corresponds to the average brightness of the field, and carries out the feedback control of the photometrical sensor 23. In step 104, in order to detect the face area of the person from the picture image that has been captured, the charge accumulation time and the output amplifier gain are set so that the face area of the person corresponds to the average brightness of the field based on a result of the photometrical process in step 101, and the charge accumulation and reading is carried out. In step 105, a subroutine for a process of detecting a person shown in FIG. 8 is carried out, and the face area of the person is identified in the picture image that has been captured.

Figure 8:
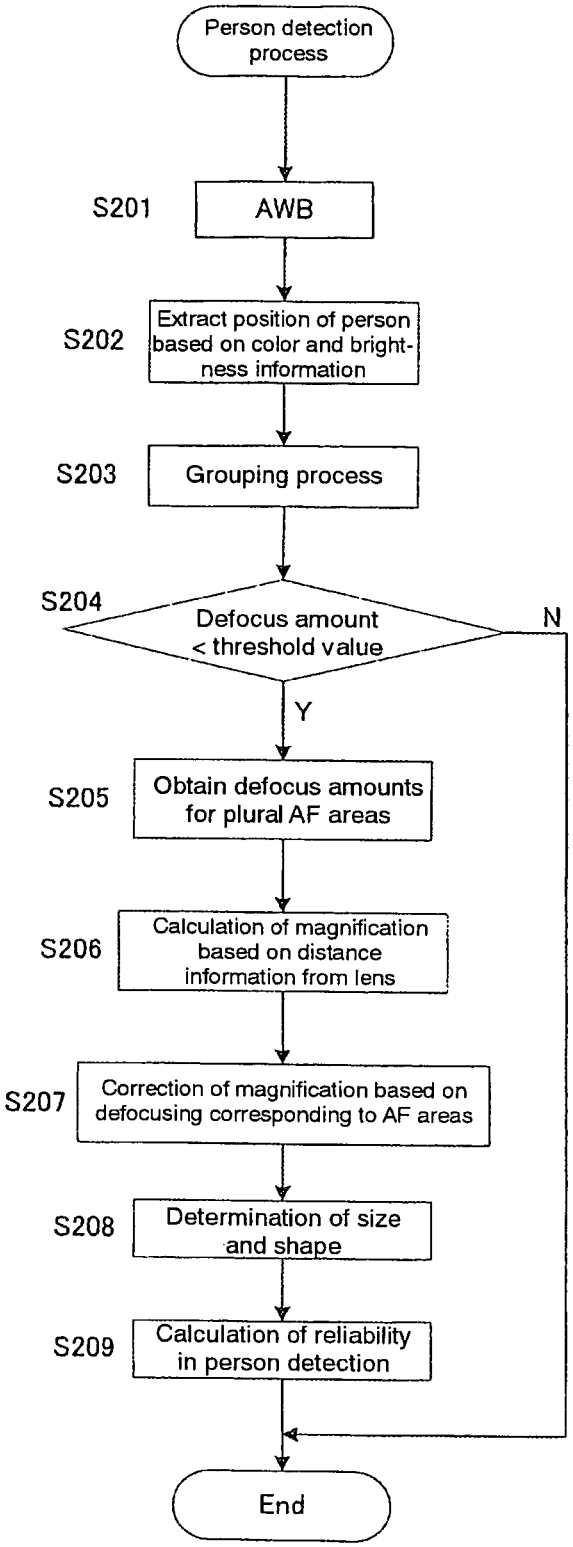
FIG. 8 is a flowchart illustrating a subroutine for detecting a person.

FIG. 8 is a flowchart illustrating the subroutine for detecting a person. In step 201, a white balance correction is carried out for data outputted from the photometrical sensor 23. In step 202, the candidates for the face area of the person (for example, skin color areas) are extracted based on the color information and the brightness information of the picture image that has been captured, and in step 203 that follows, the candidates for the face area of the person is grouped for each person. In step 204, it is determined whether or not the defocus amount as a result of the AF process (see step 13 in FIG. 6) becomes smaller than a predetermined threshold value. Specifically, it is confirmed whether or not the focus is on the subject to some extent, and the extraction process of the candidates for the face area of the person is repeated until the focus is on the subject to some extent.

Once the defocus amount becomes smaller than the predetermined threshold value, the operation proceeds to step 205, and the defocus amounts for all of the focus detection area are obtained. In step 206, the magnification M is calculated using the above-described first equation based on the distance information (the focal length, the subject distance, and the distance error information) obtained from the lens drive control device 33. In step 207 that follows, the magnification M is corrected according to the defocus amount for each focus detection area corresponding to each of the candidates for the face area of the person (see steps 202 to 203) (see the second and third equations), thereby calculating the magnification M' of each candidate for the face area of the person.

In step 208, such as a width and an area for each candidate for the face area of the person are estimated based on the magnification M' after the correction, an allowable range for such as the width or area is calculated based on the distance error information, and it is determined whether or not such as the width and area of each candidate for the face area of the person are within the allowable range. Then, the candidates for the face area of the person that are not within the allowable range are deleted. In step 209, the candidate for the face area of the person that is within the allowable range is determined to be the true face area, and reliability of the result of this face area detection is calculated. The reliability is determined based on such as an occurrence rate of the face area and a degree of similarity between the face area candidate and the size of the face based on the magnification M'.

In the AF process in step 13 in FIG. 6 after the person detection process, the focus lens of the imaging lens 31 is driven according to the defocus amount for the true face area having high reliability, and the focus is brought on the true face area.

In the one embodiment as described above, the description is given taking the person's face as an example of the target object detected from the picture image. However, the target object detected from the picture image is not limited to the face, and for example, can be an animal or moving objects of various of types.

Further, in the one embodiment as described above, the magnification is calculated using the body drive control device 24 based on the distance information (the focal length and the camera-to-subject distance) obtained from the lens drive control device 33. However, the magnification can be calculated using the lens drive control device 33 based on the distance information, and then the magnification can be transmitted to the body drive control device 24. Further, in the one embodiment as described above, the defocus amount is calculated using the phase difference between the pair of images. However, it is also possible that a focal point evaluation value that is equivalent to the defocus amount is calculated by contrast using an imaging device and the like.

Moreover, in the one embodiment as described above, the target object candidates are recognized using the photometrical sensor 23 based on the color information and the brightness information of the picture image that has been captured. However, the target object candidates can be recognized based on at least one of the color information and the brightness information. In addition, the target object candidates can be recognized based on a characteristic area (for example, an arrangement of eyes, a nose, and a mouth, in case a person's face is used as the target object) of the target object.

As described above, according to the one embodiment, the candidates for the target object (such as the person's face) are recognized from the picture image that has been captured as the target object candidates using the photometrical sensor 23 that captured an image formed by the imaging lens 31, the magnification of the image of the target object candidates is obtained and corrected based on the result of the focus detection for the target object candidates detected by the focus detection device 15, and the target object is determined from the target object candidates based on the corrected magnification. Accordingly, it is possible to accurately estimate the size of the target object to correctly determine the target object from the picture image before the focusing, and it is also possible to accurately estimate the size of the target object that is not focused to correctly determine the target object from the picture image after the focusing.

Moreover, according to the one embodiment, the focus adjustment of the imaging lens 31 is carried out based on the result of the focus detection by the focus detection device 15 corresponding to the target object determined from the picture image. Accordingly, it is possible to accurately bring the focus on the target object.

Further, according to the one embodiment, the size of the target object candidates is detected based on the corrected magnification based on the result of the focus detection, and the allowable value of the size is set based on the distance error information, and if the size of the target object candidate is within the range of the allowable value, the target object candidate is determined to be the target object. Accordingly, it is possible to accurately calculate the magnification eliminating an influence of the errors in the focal length and the camera-to-subject distance, thereby selecting the target object even more accurately.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An imaging system comprising:
    an imaging device configured to capture an image formed by an imaging optics;
    a recognition device configured to recognize a target object candidate in the image captured by the imaging device;
    a focus detector configured to detect a focus adjustment state of the imaging optics;
    a correcting device configured to obtain a magnification of an image of the target object candidate in a state where a focus is at a position different from the target object candidate and configured to correct the magnification based on a defocus amount of a focus detection area corresponding to the target object candidate detected by the focus detector; and a selecting device configured to select a target object from the target object candidate based on the corrected magnification corrected by the correcting device.

2. The imaging system according to claim 1, wherein the target object is a person's face, and wherein the recognition device is configured to recognize the target object candidate based on color information and brightness information of the image captured by the imaging device.

3. The imaging system according to claim 1, further comprising:

a focus adjusting device configured to adjust a focus of the imaging optics based on the focus adjustment state detected by the focus detector with respect to the target object selected by the selecting device.

4. The imaging system according to claim 1, wherein the selecting device is configured to detect a size of the target object candidate based on the corrected magnification, set an allowable size based on distance error information, and determine the target object candidate if the size of the target object candidate is within the allowable value.

5. The imaging system according to claim 1, wherein, when the focus detector detects a plurality of focus adjustment states with respect to the target object candidate, the correcting device is configured to select the magnification so that the corrected magnification is closest to an average value.

6. The imaging system according to claim 1, further comprising:

a magnification detector configured to detect the magnification of the target object candidate recognized by the recognition device based on distance information of the imaging optics.

7. The imaging system according to claim 1, wherein the correcting device configured to obtain the magnification of the image of the target object candidate while the focus is maintained at the position different from the target object candidate.

8. A method for detecting a target object, the method comprising:

capturing an image formed by an imaging optics;

recognizing a target object candidate in the captured image;

detecting a magnification of an image of the target object candidate based on distance information of the imaging optics, wherein the magnification is detected in a state where a focus is at a position different from the target object candidate;

detecting a focus adjustment state of the imaging optics;

correcting the magnification based on a defocus amount of a focus detection area corresponding to the target object candidate;

selecting a target object from the target object candidate based on the corrected magnification; and detecting the target object in the captured image.

9. The method according to claim 8, wherein the target object is a person's face, and wherein the target object candidate is recognized based on color information and brightness information of the captured image.

10. The method according to claim 8, further comprising:

adjusting a focus of the imaging optics based on the focus adjustment state with respect to the target object.

11. The method according to claim 8, wherein a size of the target object candidate is detected based on the corrected magnification, an allowable size is set based on distance error information, and the target object candidate is selected if the size of the target object candidate is within the allowable value.

12. The method according to claim 8, wherein, when the focus detector detects a plurality of focus adjustment states with respect to the target object candidate, the magnification is selected so that the corrected magnification is closest to an average value.

13. The method according to claim 8, further comprising:

detecting the magnification of the target object candidate recognized by the recognition device based on distance information of the imaging optics.

14. The method according to claim 8, wherein the magnification of the image of the target object candidate is detected while the focus is maintained at the position different from the target object candidate.

15. An imaging system comprising:

imaging means for capturing an image formed by an imaging optics;

recognition means for recognizing a target object candidate in the image captured by the imaging means;

focus detection means for detecting a focus adjustment state of the imaging optics;

magnification obtaining means for obtaining a magnification of an image of the target object candidate in a state where a focus is at a position different from the target object candidate;

correcting means for correcting the magnification based on a defocus amount of a focus detection area corresponding to the target object candidate detected by the focus detection means; and selecting means for selecting a target object from the target object candidate based on the corrected magnification corrected by the correcting means.

16. The imaging system according to claim 15, wherein the magnification obtaining means obtains the magnification of the image of the target object candidate while the focus is maintained at the position different from the target object candidate.

* * * * *